March 21, 1939.  H. F. HEISLER  2,150,972
FOOT-ACTUATED THROTTLE DEVICE
Filed Oct. 4, 1937
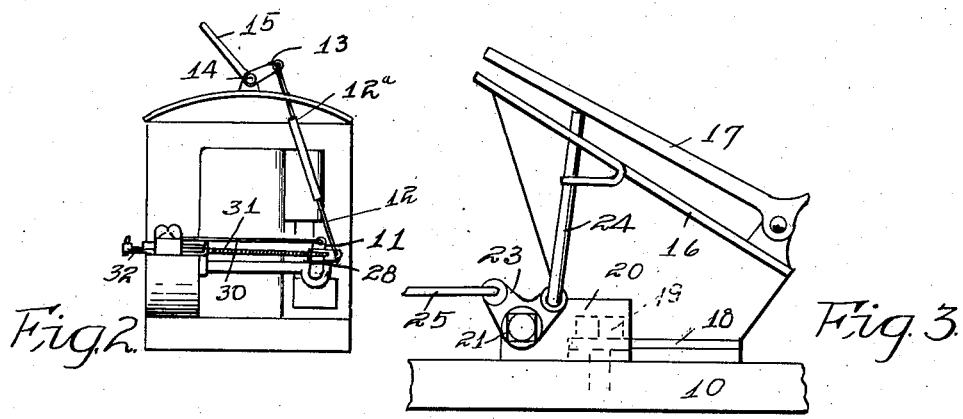
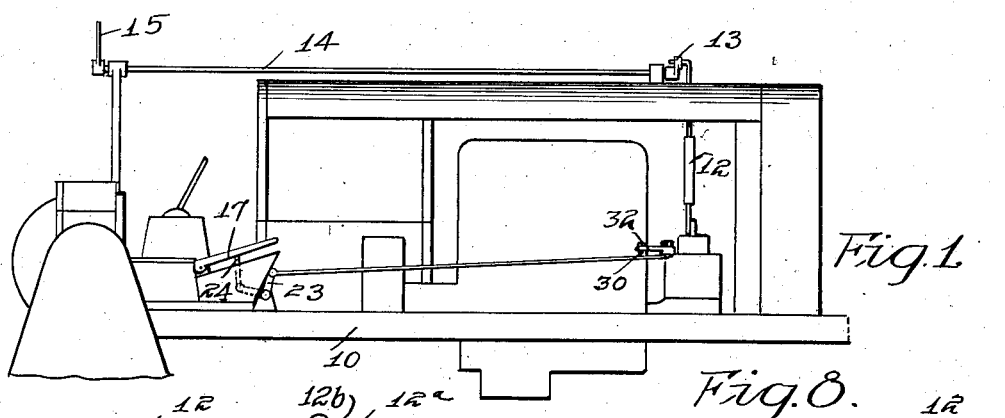
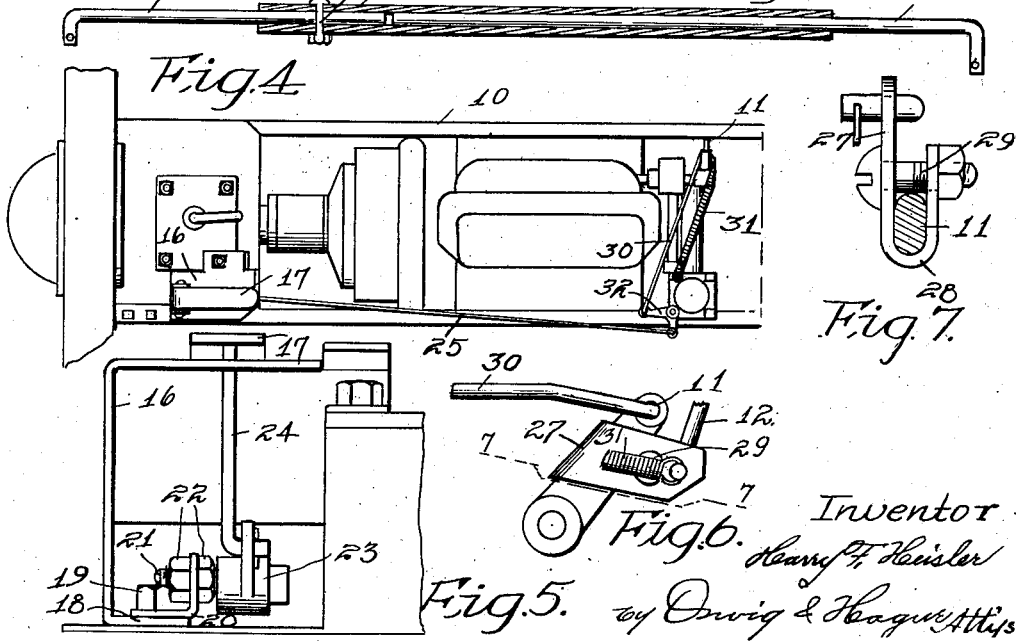
Inventor
Harry F. Heisler
by Orwig & Hague Attys Patented Mar. 21, 1939

2,150,972

UNITED STATES PATENT OFFICE 2,150,972

FOOT-ACTUATED THROTTLE DEVICE

Harry F. Heisler, Waterloo, Iowa

Application October 4, 1937, Serial No. 167,237

3 Claims. (Cl. 74—482)

Tractors for farming and other purposes are at the present time equipped with a hand controlled throttle for regulating their speed of advance. In many instances, and especially in farming with tractor drawn cultivators, planters, etc., the hands of the operator are engaged in controlling such other implements and consequently the speed of the tractor is not always properly controlled resulting in inefficient farming operations.

The object of my invention is to provide a foot throttle device of simple and inexpensive construction especially designed to be readily, quickly and easily applied by an unskilled operator to an ordinary tractor as an accessory, and when thus applied, to give to the operator full control of the tractor speed at such time as his hands may be occupied with control of other parts of the tractor or implement being drawn by the tractor.

Referring to the accompanying drawing,

Figure 1 shows a side elevation of a part of a tractor having my improved foot actuated throttle device applied thereto.

Figure 2 shows a front end elevation of same.

Figure 3 shows an enlarged detail side elevation illustrating the foot throttle unit.

Figure 4 shows a top or plan view of a portion of a tractor having my improved device applied thereto.

Figure 5 shows an enlarged detail front elevation of my improved foot actuated throttle unit.

Figure 6 shows an enlarged detail side view of my improved unit for connecting the foot actuated throttle device with the throttle lever.

Figure 7 shows a sectional view taken on the line 7—7 of Figure 6; and

Figure 8 shows a detail side view of the adjustable rod for connecting the foot pedal device to the throttle lever.

In the accompanying drawing I have used the reference numeral 10 to indicate generally the frame of a tractor having a lever 11 for controlling the tractor throttle. This lever is normally connected to a rod 12, connected to a crank 13 fixed to the shaft 14 to which the ordinary hand-controlled throttle lever 15 is applied. This part of the equipment is that customarily in use on tractors.

My improvement comprises three units, the first of which I have called the "pedal control throttle unit". It comprises a plate metal frame 16, the top of which, as shown in Figure 1, inclines upwardly away from the driver's seat, and on top of which is pivoted a foot throttle lever 17. A part of the frame 16 is turned inwardly forming a base 18, and this base is shaped to rest upon the adjacent portion of the tractor frame and be clamped thereto by the bolt 19 which is seated in the tractor frame. Mounted on top of this base member 18 is a sheet metal angle bar 20, one end of which rests upon the base member 18 and is held in position by the bolt 19, and the other part extends upwardly and has a bolt 21 fixed therein by the nuts 22. Mounted upon this bolt 21 is a bell crank lever 23 to one end of which is pivoted an upright rod 24 which extends upwardly through the frame member 16 and into engagement with the foot throttle lever 17, and to the other end of the bell crank lever 23 is attached a rod 25.

The second unit for attachment to the engine control throttle lever 11, comprises an arm 27 having a U-shaped loop 28 designed to receive the lever 11 and to be adjustably fixed thereto by means of the bolt 29. Connected to the throttle lever 11 is a rod 30 which extends transversely of the tractor and is attached to the third unit of my device hereinafter described. Connected to the rod 12 is a contractile coil spring 31 which extends across the tractor frame and is detachably secured to a part of the tractor frame.

The third unit of my improvement comprises a bell crank lever 32 pivoted to a part of the tractor frame and having one of its arms pivoted to the rod 30. This other arm is connected by the rod 25 with the bell crank lever 23.

When it is desired to apply my improvement to an ordinary tractor it is only necessary to remove one of the tractor frame bolts 19, place the foot pedal unit and the angle bar 20 in position, and then return the bolt to its position for locking this unit in place. Then the operator applies the arm 27 to the engine throttle control lever 11, and he finally connects the bell crank lever 32 with a part of the tractor frame and applies the rods 30 and 25 to the bell crank lever. All of this obviously may be done very quickly and easily, and regardless of the size or shape of the tractor the rods 30 and 25 may be readily and easily cut to the right length and applied to the bell crank lever 32. After the device has thus been applied, the operator then adjusts the position of the arm 27 relative to the throttle lever 11 and then secures it in that position by tightening the bolt 29. In this way the operator can apply the desired amount of spring tension to the foot control lever so that either the foot control lever or the hand control lever of the tractor may be used by the operator and, hence, under such conditions where the operator's hands are busily engaged with other parts of the apparatus, the operator may have full control of the tractor through my improved pedal actuated throttle device.

In Figure 8 of the drawing I have illustrated the structure in detail of the rod 12. This rod is pivoted at its upper end to the arm 13 connected with the throttle lever 15. At its lower end it is inserted in a sleeve 12a to which it is fixed by a cotter pin 12b. The lower portion of the rod 12 has its upper end slidingly inserted in the lower end of the sleeve 12a and its lower end is pivoted to the arm 27, as shown in Figure 6. By this means the lever 15 may be operated by hand in the ordinary manner. When, however, it is desired to operate the throttle lever 11 by the pedal, the lower end of the rod 12 will slide freely within the sleeve 12a and the throttle lever 11 will be moved by the pedal in one direction to open position and the spring 31 will move the throttle lever 11 to closed position.

I claim as my invention:

1. A foot actuated throttle device for tractors having a hand actuated throttle device including a throttle lever for controlling the engine speed, comprising a foot throttle unit consisting of a frame to be bolted to a tractor frame, a pedal hinged to the frame, a bell crank lever pivoted to the frame, an actuating rod pivoted to the bell crank lever and projected up through and guided by said frame and in engagement with the pedal, a second unit designed to be fixed to the tractor throttle lever and comprising an arm, means for detachably and adjustably fixing it to said throttle lever, means for operatively connecting said throttle lever with said bell crank lever, and a spring for normally holding said throttle lever closed and the foot pedal elevated.

2. A foot actuated throttle device for tractors having a hand actuated throttle device including a throttle lever for controlling the engine speed, comprising a foot throttle unit consisting of a frame to be bolted to a tractor frame, a pedal hinged to the frame, an angle plate within said frame, a bolt extended through the angle plate and said frame and designed to be secured to a tractor frame, a bell crank lever fulcrumed to said angle plate, a throttle rod connected to said bell crank and extended upwardly through and guided by said frame and in engagement with the said pedal, a second unit comprising an arm having a U-shaped extension at one end to pass around the throttle lever of a tractor, a bolt passed through said arm and extension for detachably and adjustably securing said arm to the throttle lever, and a third unit comprising a bell crank lever to be fulcrumed to a tractor frame, rods connecting it with said throttle lever and with the bell crank lever of the foot throttle unit, and a spring for normally holding said throttle lever in its normally inoperative position.

3. A foot actuated throttle device for tractors having a hand actuated throttle device including a throttle lever for controlling the engine speed, a hand operated lever for controlling said throttle lever, comprising a foot throttle unit consisting of a frame to be bolted to a tractor frame, a pedal hinged to the frame, an angle plate within said frame, a bolt extended through the angle plate and said frame and designed to be secured to a tractor frame, a bell crank lever fulcrumed to said angle plate, a throttle rod connected to said bell crank and extended upwardly through and guided by said frame and in engagement with the said pedal, a second unit comprising an arm having a U-shaped extension at one end to pass around the throttle lever of a tractor, a bolt passed through said arm and extension for detachably and adjustably securing said arm to the throttle lever, and a third unit comprising a bell crank lever to be fulcrumed to a tractor frame, rods connecting it with said throttle lever and with the bell crank lever of the foot throttle unit, a spring for normally holding said throttle lever in its normally inoperative position, and means for operatively connecting said hand operated lever with said throttle lever, comprising two rods having a limited sliding connection, one rod being operatively connected to the said hand operated lever and the other to the said arm, whereby the hand operated lever may move the said throttle lever to open position and the said spring will move it to closed position.

HARRY F. HEISLER.